US005634850A

United States Patent [19]
Kitahara et al.

[11] Patent Number: 5,634,850
[45] Date of Patent: Jun. 3, 1997

[54] IMAGE PROCESSING DEVICE AND METHOD

[75] Inventors: Atsushi Kitahara; Yutaka Okunoki, both of Tokyo, Japan

[73] Assignee: Sega Enterprises, Ltd., Tokyo, Japan

[21] Appl. No.: 374,561

[22] PCT Filed: May 20, 1994

[86] PCT No.: PCT/JP94/00810

§ 371 Date: Jan. 20, 1995

§ 102(e) Date: Jan. 20, 1995

[87] PCT Pub. No.: WO94/28507

PCT Pub. Date: Dec. 18, 1994

[30] Foreign Application Priority Data

May 21, 1993 [JP] Japan .................... 5-120204

[51] Int. Cl.⁶ .................................................. A63F 9/22
[52] U.S. Cl. ..................... 463/33; 463/31; 463/30; 395/118; 395/133; 345/115; 345/122
[58] Field of Search ............... 345/112–115, 118, 345/121–123; 273/433–434, 85 G, DIG. 28; 364/410; 395/118, 152–153; 463/1, 30–31, 33–34, 43, 48

[56] References Cited

U.S. PATENT DOCUMENTS

| | | | |
|---|---|---|---|
| 4,026,555 | 5/1977 | Kirschner et al. | 273/DIG. 28 |
| 4,324,401 | 4/1982 | Stubben et al. | 463/31 |
| 4,398,189 | 8/1983 | Pasierb, Jr. et al. | 273/DIG. 28 |
| 4,445,114 | 4/1984 | Stubben . | |
| 4,463,380 | 7/1984 | Hooks, Jr. | 348/552 |
| 4,517,654 | 5/1985 | Carmean | 463/31 |
| 4,580,782 | 4/1986 | Ochi | 273/85 G |
| 4,672,541 | 6/1987 | Bromley et al. | 273/85 G |
| 4,766,541 | 8/1988 | Bleich et al. | 463/31 |
| 4,824,106 | 4/1989 | Ueda et al. | 273/434 |
| 4,864,289 | 9/1989 | Nishi et al. . | |
| 4,890,833 | 1/1990 | Lantz et al. | 273/85 G |
| 4,895,376 | 1/1990 | Chiang Shiung-Fei | 273/434 |
| 5,007,005 | 4/1991 | Hatakeyama et al. | 345/122 |
| 5,090,909 | 2/1992 | Kellar et al. | 345/113 |
| 5,125,671 | 6/1992 | Ueda et al. | 273/434 |
| 5,262,965 | 11/1993 | Putnam et al. | 348/552 |
| 5,308,086 | 5/1994 | Ueda et al. | 273/434 |
| 5,327,158 | 7/1994 | Takahashi et al. | 273/DIG. 28 |
| 5,356,156 | 10/1994 | Suzuki et al. | 345/122 |
| 5,416,497 | 5/1995 | Nishi et al. | 345/122 |

FOREIGN PATENT DOCUMENTS

| | | |
|---|---|---|
| 62-149287 | 7/1987 | Japan . |
| 62-200468 | 9/1987 | Japan . |
| 2-230474 | 9/1990 | Japan . |
| 2-3082376 | 12/1990 | Japan . |
| 128691 | 7/1984 | Taiwan . |

OTHER PUBLICATIONS

Multimedia Applications Development: Using DVI Technology, J. Bunzel, 1992, pp. 28–29, 38–39, 154–157.
Multimeda: Making It Work, "The Tempura Media Solution," T. Vaughn, 1993.
Nikkei Electronics 1990 10–15, pp. 124–129.

*Primary Examiner*—Jessica Harrison
*Assistant Examiner*—Mark A. Sager
*Attorney, Agent, or Firm*—Dickstein Shapiro Morin & Oshinsky LLP

[57] ABSTRACT

An processing device and method by which a foreground to be combined with a background can be displayed with natural motion and a realistic superimposed image can be displayed. The image processing device, which combines first image data (foreground data) stored in a first memory (23) with second image data (background data) stored in a second memory (24) and outputs a superimposed image, includes a third memory (13) which stores image data of a moving picture, and means (17, 20) for reading the data of the moving picture from the third memory (13) and storing the data of the moving picture in the first memory (23) as the first image data.

15 Claims, 10 Drawing Sheets

FIG. 4 a) ☐ SQUARE FIGURE OF CERTAIN UNIT (CELL)

b) ▨ SMALL AMOUNT OF DATA c) ▦

PATTERN NAME TABLE
STORE ARRANGEMENT OF CELLS

OUTPUT OF PRIORITY CIRCUIT 30

IMAGE PROCESSING DEVICE AND METHOD

TECHNICAL FIELD

The present invention relates to an image processing device and method, and more particularly to an image processing device having a function of superimposing a foreground image and a background image.

BACKGROUND ART

Conventionally, a video game device is known such a kind of image processing device. The video game device is connected to a monitor device such as a CRT or a liquid crystal display. An image of a foreground such as a character coming on a game is superimposed with an image of a background and is displayed on the monitor device. The game is played by changing the foreground image and the background image in response to a control signal input by the player.

The foreground contains an object (character) having motion, such as a human being or an animal. The motion of the character is represented by changing its position and shape on the display. For example, the motion of a player character, which is a character directly controlled by the player, is represented so that the position and shape of the player character is changed in accordance with the control signal given by the player.

Conventionally, in order to represent the motion of the character and the like by a change of its shape, still pictures having different shapes are produced beforehand and are stored in a non-volatile memory such as a ROM. A series of motion is represented by sequentially reading the still pictures from the memory. The still pictures may be artificially produced or pictures extracted from a natural picture taken by a video camera in a time-lapse way.

The technique of representing the motion of the character by means of the still pictures can reduce the capacity of the memory to be built in the video game device, while it provides an unnatural motion of the character and the player feels insufficient reality during play of the game.

DISCLOSURE OF THE INVENTION

The present invention was made taking into consideration the above, and has an object of providing an image processing device and method capable of representing natural motion of a foreground image to be superimposed with a background image and representing a resultant image having good reality.

In order to overcome the above disadvantages, the image processing device of the present invention, in which a superimposed image is produced by combining first image data stored in a first memory (23) and second image data stored in a second memory (24), includes a third memory (13) storing data of a moving picture, and means (17, 20) for reading the data of the moving picture from the third memory and storing, as the first image data, the data of the moving picture in the first memory.

The disadvantages described above can also be overcome by a method of obtaining a superimposed image by combining first image data stored in a first memory (23) and second image data stored in a second memory (24), the method including a first step ([6], [7]) of storing data of a moving picture in a third memory (13), and a second step ([9]-[11]) of reading the data of the moving picture from the third memory and storing, as the first image data, the data of the moving picture in the first memory.

BRIEF DESCRIPTION OF THE DRAWINGS

Other objects, features and advantages of the present invention will become apparent from the following description read in conjunction with the accompanying drawings, in which.

BEST MODE FOR CARRYING OUT THE INVENTION

A description will now be given of embodiments of the present invention with reference to the accompanying drawings.

Figure 1:
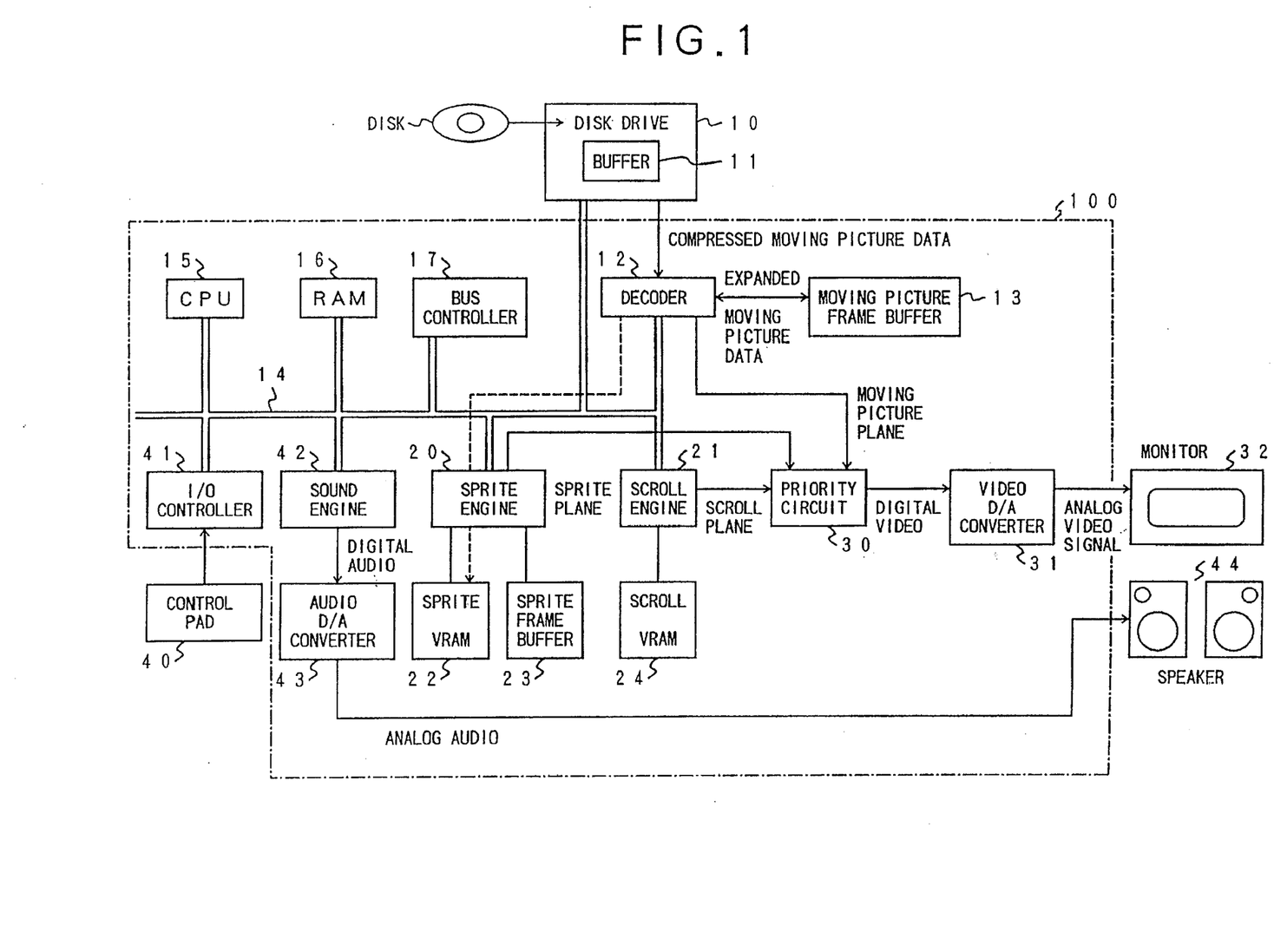
FIG. 1 is a block diagram of an image processing system which uses an image processing device according to an embodiment of the present invention.

FIG. 1 is a block diagram of an embodiment of the present invention. An image processing device 100 shown in FIG. 1 is used together with a disk drive 10, a monitor 32 and speakers 44, so that a video game system can be formed. For example, a video game device for home use is configured so that the image processing device 100 functions as a device main body, to which a television set 101 having the monitor 32 and the speakers 44 are connected. Further, a disk (such as a CD-ROM) which stores a program of a game which the player wants to play is set in the disk drive 10.

The disk stores, in addition to the above program, sound data and image data of a moving picture formed by a natural picture or the like. It will be noted that the moving picture is defined as a picture having a series of motion represented by, for example, 10-60 sheets (frames) of image data (patterns) per second. For example, an image itself taken by the video camera is a moving picture. Hence, the sheets of image data are ordinarily different from each other. On the other hand, as has been described previously, a motion realized by using the still pictures is represented by repeatedly combining a few sheets of image data (patterns) together.

In order to save the available storage capacity on the disk, the moving picture data is compressed and is then stored on the disk. The compression is achieved by, for example, the MPEG (Moving Picture Experts Group) method, which is an international standard of the audio/visual signal encoding method. According to the MPEG method, it is possible to store, on one disk for 74 minutes, 30 sheets of moving picture per second and a sound obtained by 44.1 kHz sampling.

In the disk drive 10, compressed moving picture data reproduced from the disk is stored in an internal buffer 11. The above compressed moving picture data is data obtained by compressing moving picture data of the YUV system (luminance Y, color differences U and V) according to the MPEG method. The compressed moving picture data stored in the buffer 11 is then supplied to a decoder 12 of the image processing device, in which the compressed moving picture data is expanded to moving picture data of the YUV system. Then, the expanded moving picture data is written into a moving picture frame buffer 13. The decoder 12 has the function of reading the expanded moving picture data of the YUV system from the moving picture frame buffer 13, converting it into moving picture data of the RGB system and outputting the moving picture data of the RGB system. As will be described later, the moving picture data of the RGB system produced by the decoder 12 may be output to a sprite VRAM 22 via a bus 14 and may be output to a priority circuit 30.

To the bus 14, there are connected a CPU 15, a RAM 16, a bus controller 17, a sprite engine 20 performing an image process for a foreground (sprite), and a scroll engine 21 performing an image process for a background. To the sprite engine 20, there are connected to the sprite VRAM 22 storing foreground patterns, and a sprite frame buffer 23 forming a foreground pattern equal to at least one frame. A scroll VRAM 24, which stores a background pattern and has a storage area greater than one frame, is connected to the scroll engine 21.

The CPU 15 issues a command against the sprint engine 20 and the scroll engine 21 to cause these engines to produce a superimposed image. The bus controller 17 reads data of the foreground image from the moving picture frame buffer 13 at a timing in which the CPU 15 does not occupy the bus 14, and writes the read image data into the sprite VRAM 22 from the bus 14 via the sprite engine 20. All the content of the moving picture frame buffer 13 may be transferred to the sprite VRAM 22, or part (only the foreground part) of the content of the moving picture frame buffer 13 may be transferred thereto.

Figure 2:
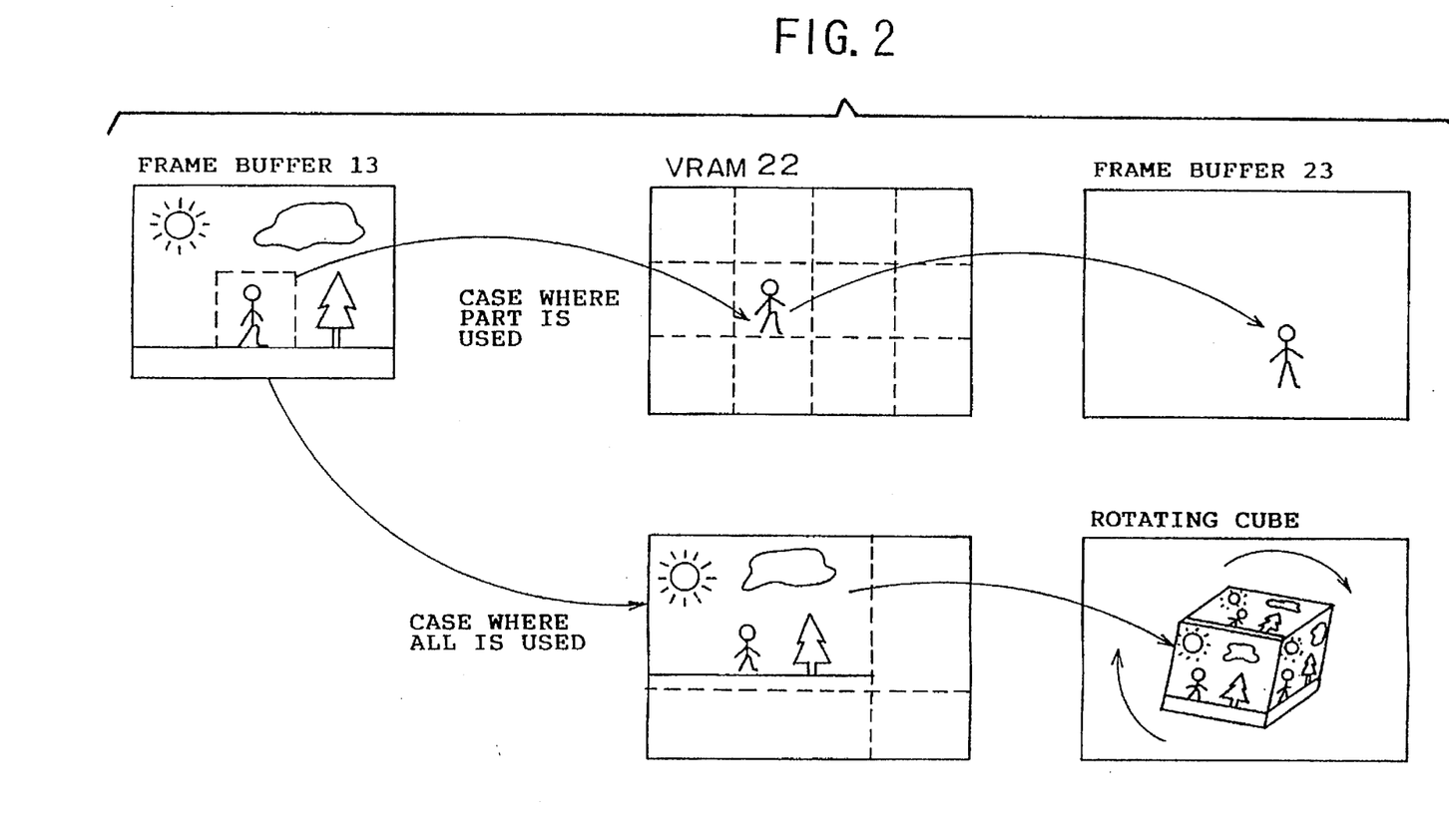
FIG. 2 is a diagram of a transfer of moving picture data from a moving picture frame buffer to a sprite VRAM shown in FIG. 1.

FIG. 2 is a diagram of a transfer of the moving picture data from the moving picture frame buffer 13 to the sprite VRAM 22. Under the control of the CPU 15, part or all of the moving picture data in the moving picture frame buffer 13 is transferred to the sprite VRAM 22. Cutting out of part of the moving picture data is carried out so that the CPU 15 outputs coordinates data for cutting-out to the frame buffer 13 via the bus controller 17. The above transfer is performed every frame of the moving picture (every pattern). In the embodiment of the present invention being considered, foreground images having natural motion can be produced by transferring the moving picture data from the moving picture frame buffer 13 to the sprite VRAM 22.

The sprite engine 20 selectively reads image data of a foreground pattern such as a character, and carries out image processes for the read image data, such as rotation, enlargement, reduction and color computation processes. Thereafter, the sprite engine 20 causes the image-processed foreground pattern to be stored in an area of the sprite frame buffer 23 specified by a given address. In the example shown in FIG. 2, picture data equal to the whole of one frame and transferred to the sprite VRAM 22 is subjected to the rotation process by the sprite engine 20 so that the transferred picture data is converted into image data forming a rotating cube, which is then stored in the sprite frame buffer 22.

Figure 3:
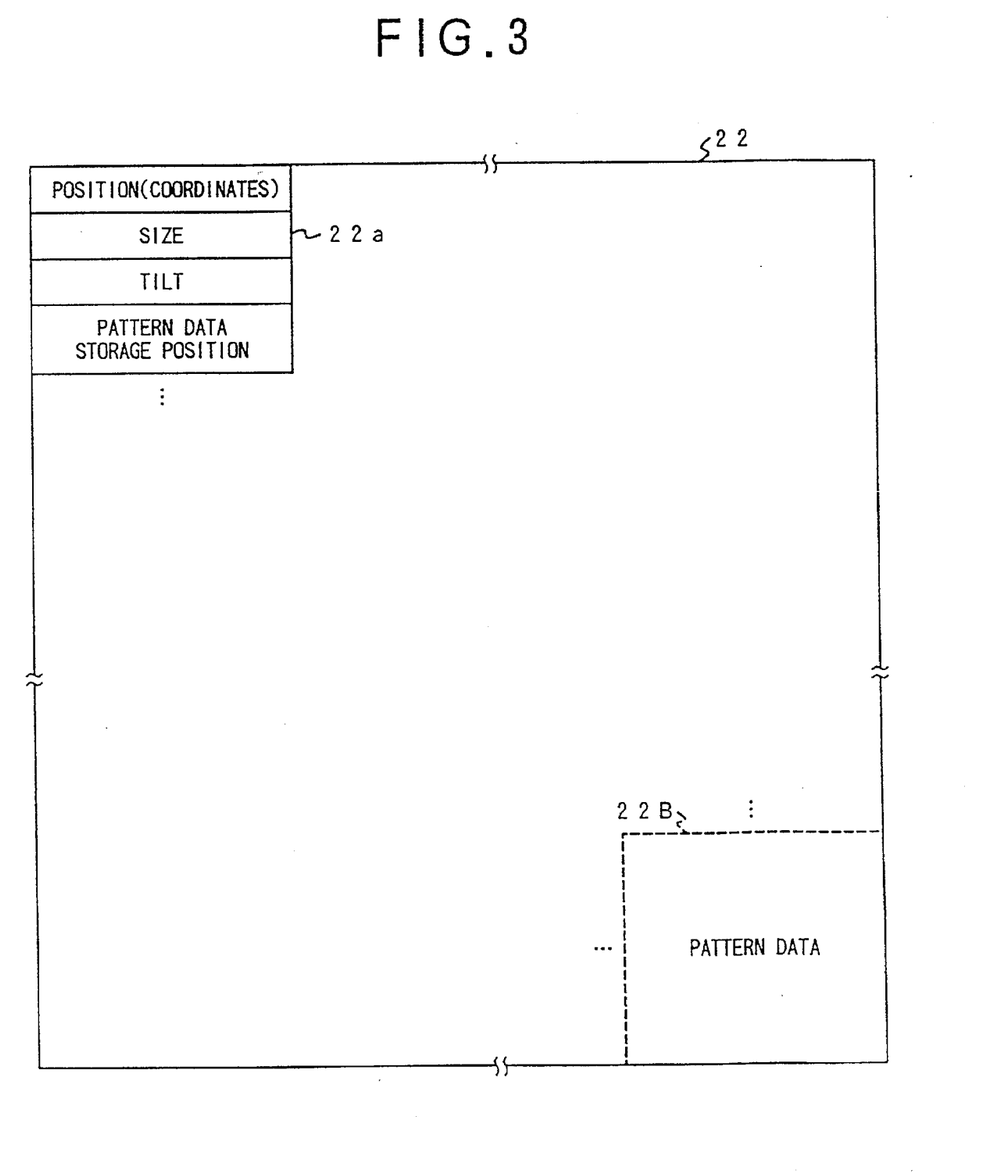
FIG. 3 is a diagram of an example of data stored in the sprite VRAM shown in FIG. 1.

FIG. 3 is a diagram of the inner part of the sprite VRAM 22. In the sprite VRAM 22, a parameter table 22A is stored in addition to a plurality of items of foreground image data (pattern data) 22B. The parameter table 22A is produced, for example, for each character contained in the foreground by the CPU 15. The parameter table 22A includes position coordinates data indicating the position of the corresponding character on the sprite frame buffer 22, the size (dimensions) of the character on the sprite frame buffer 23, data relating to the tilt of the character including rotation, and position coordinates data indicating the position in the sprite VRAM 22 storing pattern data of the character. The sprite engine 20 refers to the parameter table 22A, and writes the pattern data located in the specified position in the sprite VRAM 22 into a specified position in the sprite frame buffer 23. A transfer of the moving picture data to the sprite VRAM 22 is performed each time the moving picture data in the moving picture frame buffer 13 is updated or at an appropriate timing other than updating.

The parameters relating to representation of the foreground image are not limited to the above-described ones, but desirable parameters can be defined in the parameter table 22A. The pattern data 22B forming the foreground image is not limited to the moving picture frame buffer 13, but may include still-picture data conventionally used.

The foreground image data equal to one frame thus formed in the sprite frame buffer 23 is read by the sprite engine 20, and is directly supplied, without the bus 14, to the priority circuit 30 in synchronism with scanning of the monitor 32 (vertical, horizontal and dot synchronizations for the monitor 32).

Principally, it is sufficient for the sprite frame buffer 23 to have a storage area equal to one frame. However, it is preferable that a storage area equal to two frames be provided and the writing and reading operations on the two frames are alternately carried out in order to speed up the process.

The scroll engine 21 produces the background image, on which the characters can be moved, and other images. The scroll VRAM 24 has at least one storage area which is greater than one frame and corresponds to the scroll picture plane. The scroll picture plane corresponds to a plane obtained by extending and connecting right, left, upper and lower ends of the screen (one frame) of the monitor 32. The scroll engine 21 scrolls the background by moving the display area which is located in the scroll picture plane in the scroll VRAM 24 and is to be displayed on the monitor screen.

The background image data stored in the scroll VRAM 24 is, for example, data read from the disk drive 10 under the control of the CPU 15. In order to reduce the amount of data stored in the scroll VRAM 24, an image equal to one frame can be formed by combining squares, each having a certain size (normally, 8×8 dots or 16×16 dots) (VRAM method).

Figure 4:
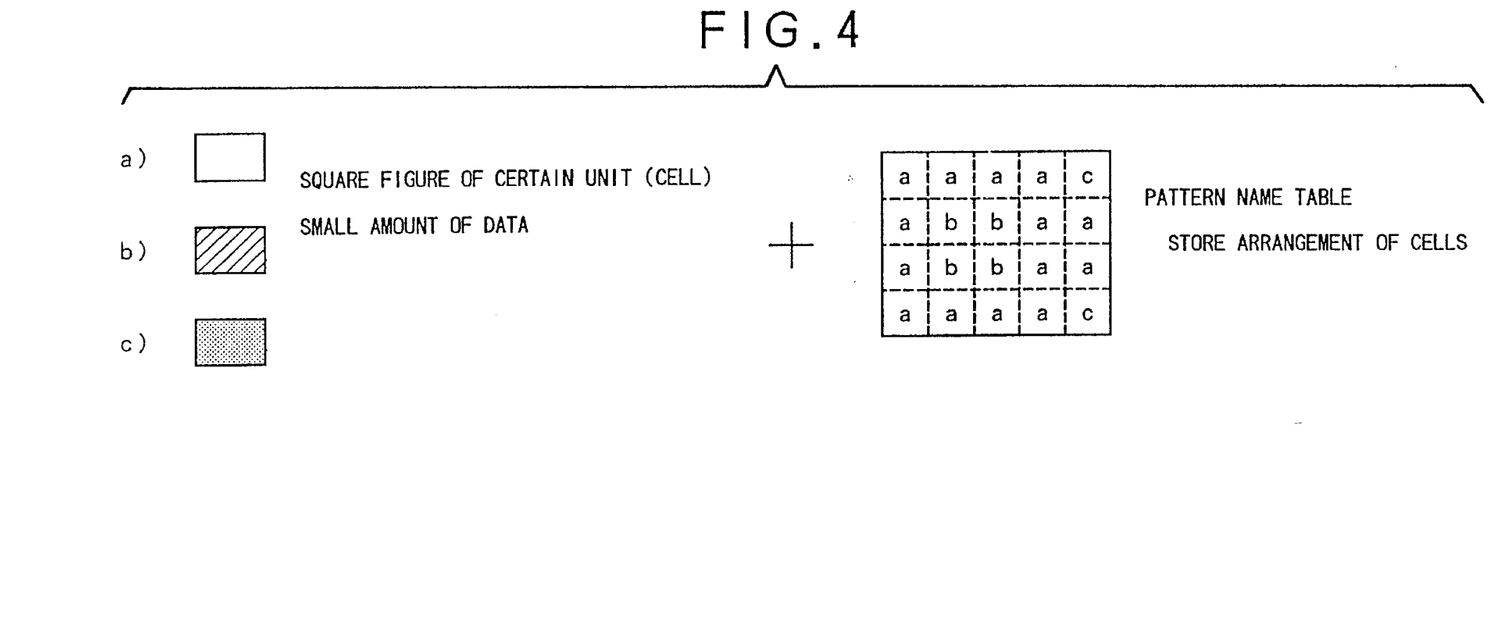
FIG. 4 is a diagram of explaining a scroll process.

FIG. 4 is a diagram showing the scroll process. Units (a), (b) and (c) having different patterns as well as a table (pattern table) defining the order of arranging these units are stored in a storage area in the scroll VRAM 24 other than the storage area used for storing the scroll picture. For example, these units are read from the CD-ROM beforehand and are stored in the scroll VRAM 24. The CPU 15 outputs the parameters relating to the scroll process to the scroll engine 21. The scroll engine 21 reads the pattern name table in the scroll VRAM 24, and then reads cells defined therein. Then, the scroll engine 21 directly outputs the scroll picture plane to the priority circuit 30 via the bus 14. The above sequential operation is carried out in real time in synchronism with the scan of the monitor 32 (vertical, horizontal and dot synchronizations).

Figure 5:
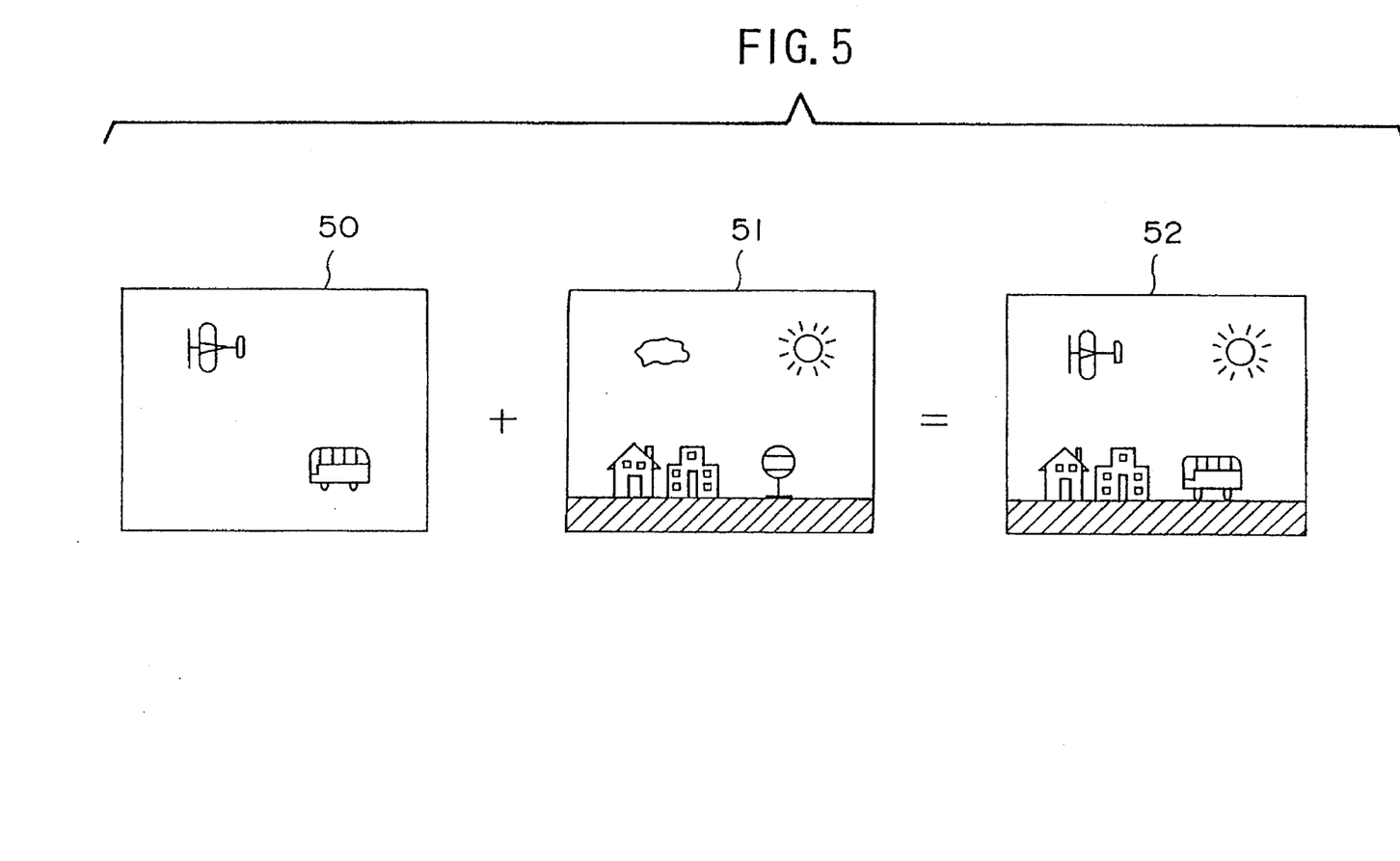
FIG. 5 is a diagram of the operation of a priority circuit shown in FIG. 1.

The priority circuit 30 receives the sprite picture plane supplied from the sprite engine 20 (for example, a picture plane 50 in FIG. 5), and the scroll picture plane supplied from the scroll engine 21 (for example, a picture plane 51 in FIG. 5), and superimposes these picture planes to thereby produce a digital video signal indicating a superimposed picture plane (52 in FIG. 5) equal to one frame. In the picture plane superimposing operation, it is necessary to determine, for each dot, whether the sprite picture plane or the scroll picture plane should be valid (selected). In order to perform the above determination, a priority bit is added to the image data forming the sprite picture plane every dot.

Figure 6A:
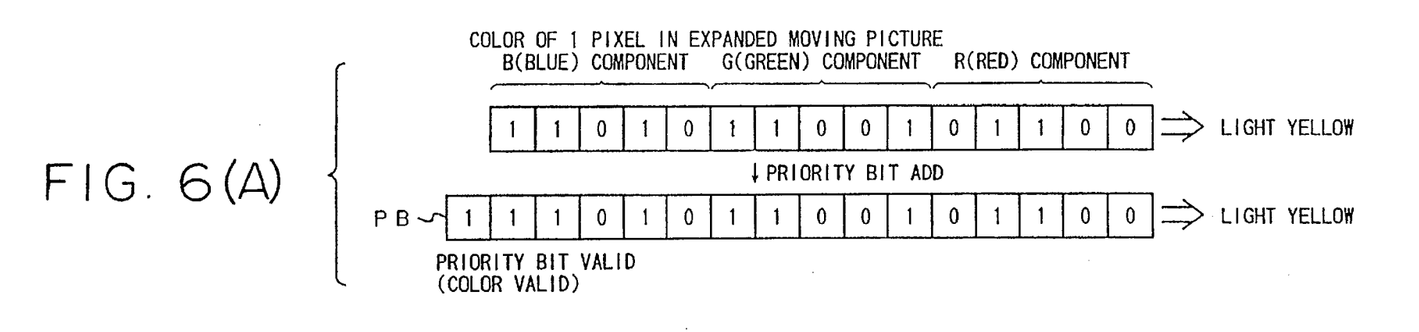
FIG. 6 is a diagram of explaining priority bits necessary for the operation of the priority circuit.
Figure 6B:
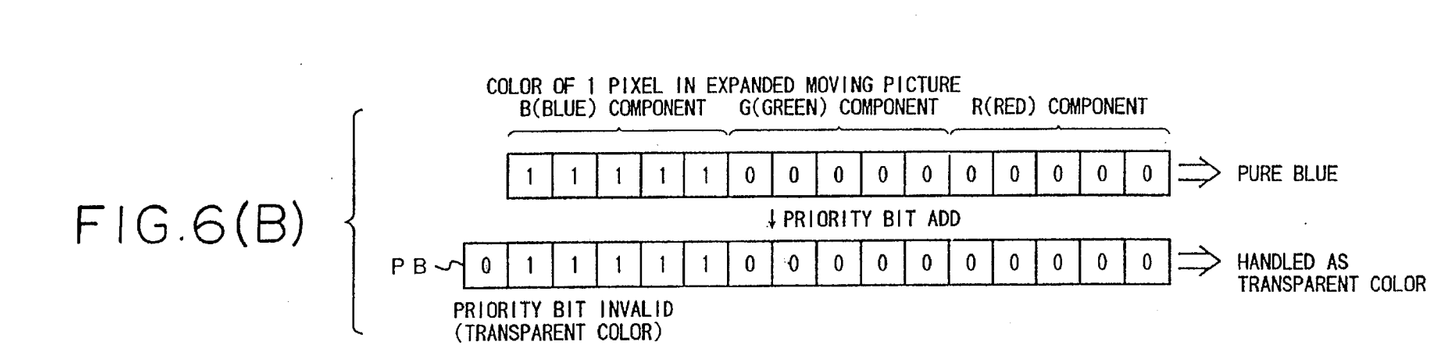

FIG. 6 is a diagram of image data of a sprite picture plane and a priority bit added thereto. As shown in part (A) of FIG. 6, one pixel in the expanded moving picture forming the sprite picture plane is expressed by 15 bits consisting of five bits for R, five bits for G and five bits for B. One pixel shown in part (A) of FIG. 6 represents light yellow. A priority bit PB of one bit is added to the one-pixel data as shown in part (A) of FIG. 6. When the priority bit PB is equal to 1 as shown in part (A) of FIG. 6, it is valid, and the corresponding one-pixel data is selected by the priority circuit 30 and is output to a video D/A converter 31. When PB=0 (shown in part (B) of FIG. 6), the priority bit is invalid, and the corresponding one-pixel data is not selected by the priority circuit 30, but one-pixel data of image data forming the scroll picture plane is selected by the priority circuit 30, and is output to the D/A converter 31. The priority bit PB shown in FIG. 6 is one bit, but may consist of a plurality of bits. For example, in the structure shown in FIG. 1, a plurality of priority bits PB, for example, two bits, are needed to process a case where the sequence of displaying the scroll picture plane and the sprite picture plane (the sequence indicating whether the scroll picture plane or the sprite picture plane should be overlapped on the other one) is specified every dot. An example of the above case is such that there are moving pictures having a near-ground and a far-ground other than images located in an equal distance, and the scroll plane or the sprite plane is inserted between the near-ground and the far-ground.

The decoder 12 shown in FIG. 1 expands the compressed moving picture data and adds the priority bit PB to the expanded data under the control of the CPU 15. Images that are contained in the foreground and are other than the moving picture are assigned the priority bits PB beforehand and are stored in the sprite VRAM 22.

The D/A converter 31 shown in FIG. 1 receives the digital video signal from the priority circuit 30, and converts it into an analog video signal, which is then output to the monitor 32. An I/O controller 41 receives a control signal from a control pad unit 40 operated by the player, and outputs it to the CPU 15. A sound engine 42 produces sounds to be output during game play, and outputs a corresponding analog audio signal to the speakers 44 via an audio D/A converter 43.

Figure 7:
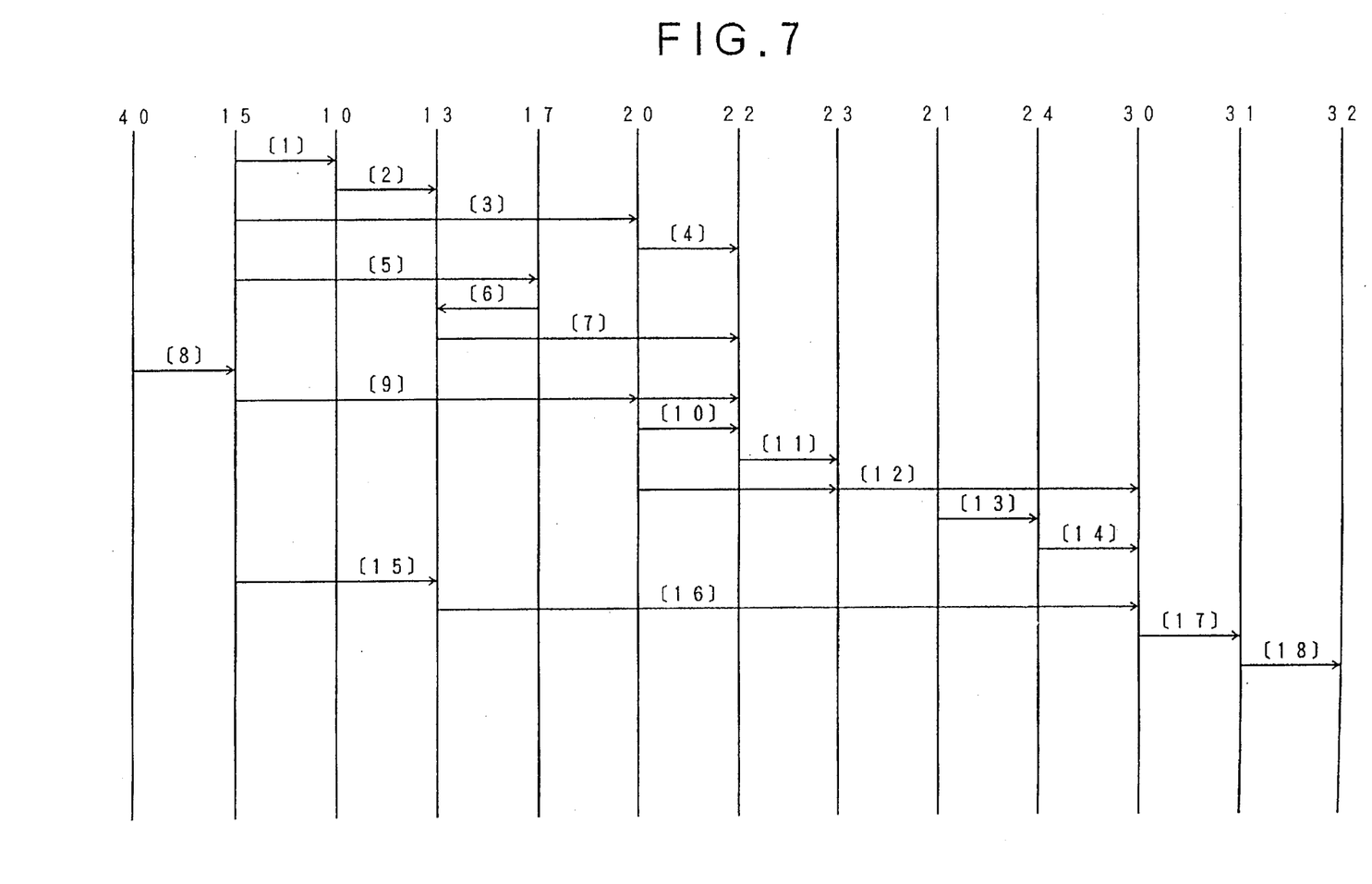
FIG. 7 is a diagram of the operation of the image processing device shown in FIG. 1.

A description will now be given, with reference to a timing chart of FIG. 7, of the operation of the image processing device 100 shown in FIG. 1. It will be noted that FIG. 7 is primarily intended to show signals transferred between parts of the image processing device 100 and these signals may not be transferred in the sequence illustrated in FIG. 7. In FIG. 7, numerals located above the vertical lines correspondence to those assigned to the blocks shown in FIG. 1.

The CPU 15 outputs an instruction for reading the disk (CD-ROM) to the disk drive 10 (step [1]). The disk drive 10 reads the specified compressed moving picture data from the disk, and stores it in the built-in buffer 11. The decoder 12 reads the compressed moving picture data from the buffer 11, and reproduces (expands) it so that expanded moving picture data is stored in the moving picture frame buffer 13 (step [2]). The CPU 15 produces the aforementioned parameter tables in the sprite VRAM 22 via the sprite engine 20 (steps [3] and [4]). For example, the parameter tables used in a fighting game are respectively produced with respect to the player's character and an enemy character, and the coordinates, sizes, tilts and pattern data storage positions of the player's character and the enemy character are stored in the respective parameter tables, as shown in FIG. 3. The motion of the player's character is controlled in accordance with the control signal input by the player via the control pad unit 40 (steps [8] and [9]). The CPU 15 updates one or plural parameters in the parameter table, such as the coordinates values, each time it receives the control signal. The parameters of the player's character such as the coordinates values are updated according to a predetermined rule under the control of the CPU 15.

The CPU 15 outputs an instruction of transferring the expanded moving picture data to the bus controller 17 (step [5]). The bus controller 17 reads the moving picture image data from the moving picture frame buffer 13, and transfers it to the sprite VRAM 22 via the bus 14 (steps [6] and [7]). The sprite engine 20 reads image data (pattern data) of the foreground (sprite) stored in the sprite VRAM 22 according to the parameter tables formed in the sprite VRAM 22, and makes the read image data stored in the sprite frame buffer 23 with the specified coordinates, size and tilt (steps [10], [11]).

After all foreground image equal to one frame is stored in the sprite frame buffer 23 in the above-mentioned way, the sprite engine 20 reads the image data of the sprite picture plane from the sprite frame buffer 23, and outputs it to the priority circuit 30 (step [12]). The scroll engine 21 reads image data of the scroll picture plane from the scroll VRAM 24, and outputs it to the priority circuit 30 (steps [13], [14]). In the case where the moving picture data stored in the moving picture frame buffer 13 is used instead of the scroll picture plane or is used as a background in addition to the scroll picture plane, the priority circuit 30 receives image data of the moving picture from the moving picture frame buffer 13 (steps [15], [16]). In accordance with the priority bit, the priority circuit 30 selects either the sprite picture plane or the scroll picture plane for each dot, and outputs the dot of the selected picture plane to the video D/A converter 31 (step [17]). In the case where the moving picture plane read from the moving picture frame buffer 13 is used, one of the planes including the above plane is selected on the one-dot basis and is output to the video D/A converter 31 (step [17]). The video D/A converter converts the received digital video signal into the corresponding analog signal, which is then output to the monitor 32 (step [18]).

In parallel to the above image processing and outputting, the sound engine 42 produces BGM, effective sounds and speech, and outputs a corresponding digital audio signal to the audio D/A converter 43. The audio D/A converter 43 converts the digital audio signal to the corresponding analog audio signal, which is then output to the speakers 44.

The above process is repeatedly performed and the game goes on.

Figure 8:
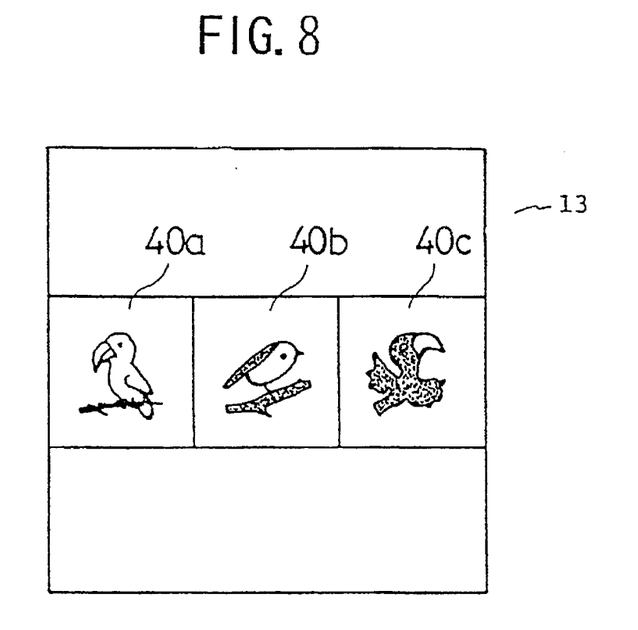
FIG. 8 is a diagram of the operation of the image processing device shown in FIG. 1.
Figure 9:
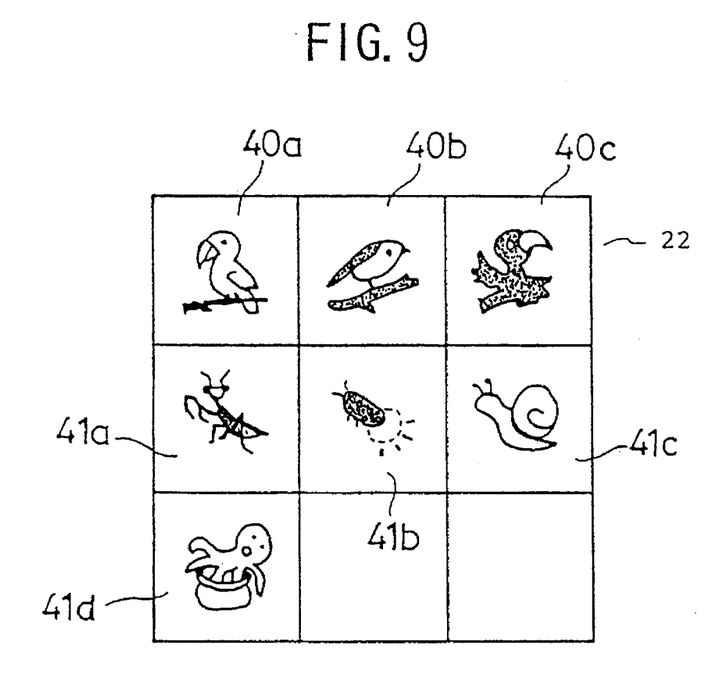
FIG. 9 is a diagram of the operation of the image processing device shown in FIG. 1.

FIG. 8 is a diagram showing that characters of moving pictures used in a game are stored in the moving picture frame buffer 13. Three moving picture characters 40a, 40b and 40c are stored in one frame of the moving picture frame buffer 13. More particularly, FIG. 8 corresponds to one scene (one frame) of moving picture data, and a large number of items of moving picture data (a large number of frames) are stored in the CD-ROM so as to lead to and follow the frame shown in FIG. 8. The moving picture data shown in FIG. 8 is subjected to a process on the frame basis so that parts 40a–40c are cut out and are then transferred to and stored in a specified area in the sprite VRAM 22. As shown in FIG. 9, foreground images 41a, 41b, 41c and 41d of still pictures may be stored in the sprite VRAM 22.

Figure 10:
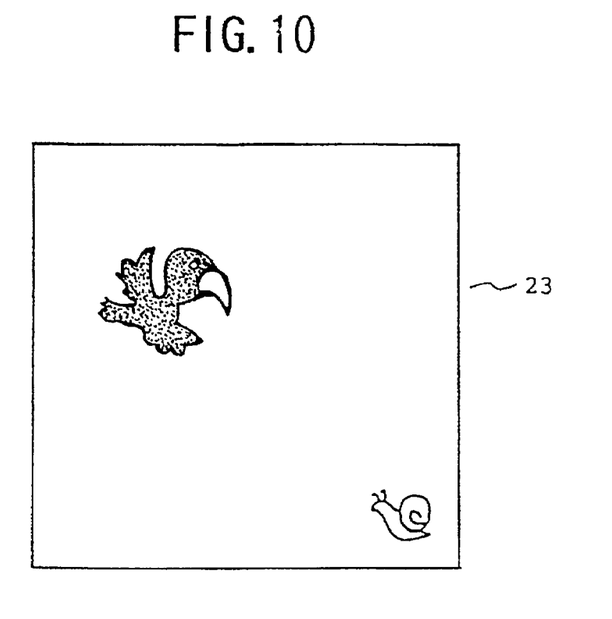
FIG. 10 is a diagram of the operation of the image processing device shown in FIG. 1.
Figure 11:
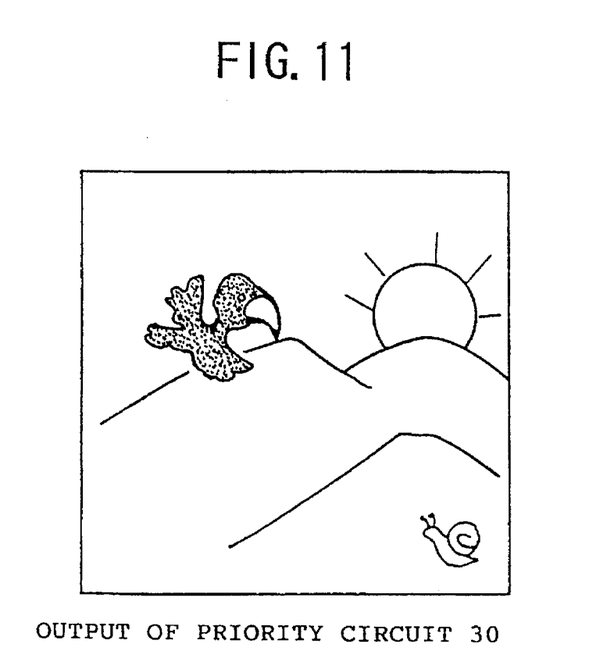
FIG. 11 is a diagram of the operation of the image processing device shown in FIG. 1.

Out of the foreground images shown in FIG. 9, the foreground image 40c is enlarged and rotated by the sprite engine 20, and is stored in the sprite frame buffer 23, as shown in FIG. 10. Further, the foreground image 41c is reduced and stored in the sprite frame buffer 23, as shown in FIG. 10. The foreground image in the sprite frame buffer 23 shown in FIG. 10 is superimposed with the background image stored in the scroll VRAM 24 by the priority circuit 30, and a resultant image as shown in FIG. 11 is produced. In the above-mentioned way, it becomes possible to realize a display in which the foreground such as characters can be changed on the frame basis and hence the foreground can be displayed as a moving picture. Hence, natural motion of characters can be obtained and reality in playing the game can be improved.

It will be noted that the sprite engine 20, the scroll engine 21 and the priority process themselves can be carried out in conventional image processing devices, and the structures thereof will be apparent to a person having ordinary skill in the art. Hence, a description of the structures referring to the detailed parts thereof will be omitted here. Normally, the sprite engine 20 and the scroll engine 21 are formed by hardware. The embodiment of the present invention being considered is intended to overcome the aforementioned disadvantages by primarily modifying signals to be processed in the structure the engines (all or part of the moving picture data is written into the sprite VRAM 22 on the frame basis).

Figure 12:
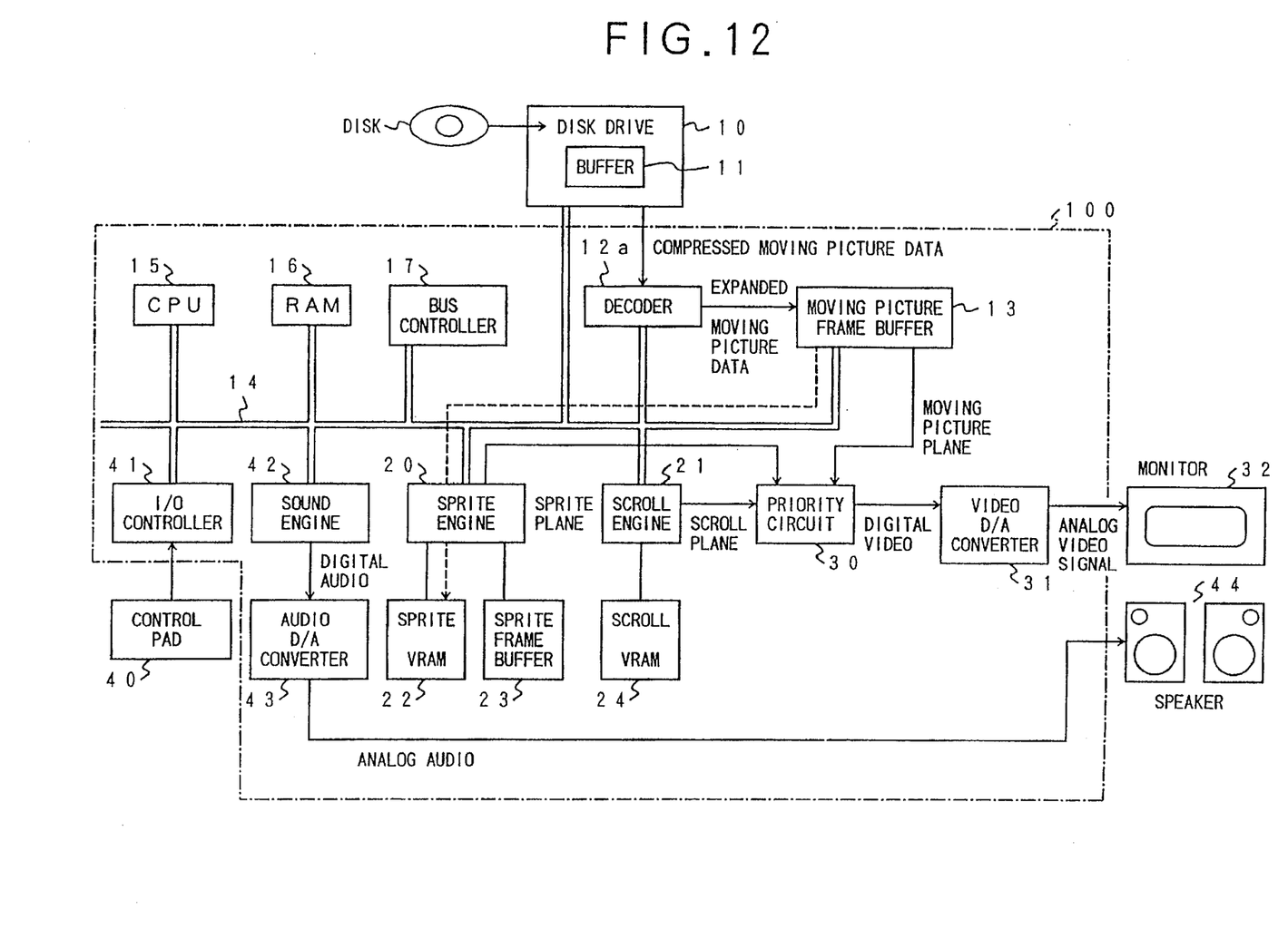
FIG. 12 is a diagram of a variation of the image processing device shown in FIG. 1.

FIG. 12 is a block diagram of a variation of the structure shown in FIG. 1. A decoder 12a shown in FIG. 12 is substituted for the decoder 12 shown in FIG. 1. In the structure shown in FIG. 12, the moving picture frame buffer 13 is directly connected to the bus 14. The decoder shown in FIG. 12 expands compressed moving picture data of the YUV system read from the buffer 11, and converts it into the RGB-system moving picture data, which is then stored in the moving picture frame buffer 13. The moving picture data of the RGB system read from the moving picture frame buffer 13 can be output to the sprite VRAM 22 and the priority circuit 30. In the above way, the moving picture frame buffer 13 used in the structure shown in FIG. 12 can store moving picture data of the RGB system.

INDUSTRIAL APPLICABILITY

As described above, according to the image processing device of the present invention, it becomes possible to use, as a foreground, a moving picture such as a character and reality of superimposed images can be improved. These advantages are very effective in practical use. The present invention is not limited to home-use game machines but includes business-use game machines. Further, the present invention is not limited to game machines but broadly includes an image processing device which superimposed images to form a picture plane.

We claim:

1. An image processing device having a first memory, first data processing means for storing image data of a first type in said first memory, a second memory for storing image data of a second type, and second data processing means for combining the image data respectively read from said first memory and said second memory and for outputting resultant image information, said image processing device being characterized by further comprising a third memory, and third data processing means for reading data of a moving picture from an outside of said image processing device and writing the data of the moving picture into said third memory, wherein said first data processing means reads the image data stored in said third memory, processes read image data as image data of the first type, and stores processed image data in said first memory.

2. An image processing device having a first memory, first data processing means for storing image data of a first type in said first memory, a second memory for storing image data of a second type, and second data processing means for combining the image data respectively read from said first memory and said second memory and for outputting resultant image information;

said image processing device being characterized by further comprising a third memory, and third data processing means for reading data of a moving picture from an outside of said image processing device and writing the data of the moving picture into said third memory, wherein said first data processing means reads the image data stored in said third memory, processes read image data as image data of the first type, and stores processed image data in said first memory;

wherein the image data of the first type is foreground image data forming a foreground of the superimposed image;

the image data of the second type is background image data forming a background of the superimposed image;

said image processing device further comprises a fourth memory for storing foreground image data, and fourth data processing means for transferring the image data stored in said third memory to said fourth memory as the foreground image data; and said first data processing means performs a predetermined image process for processing the image data read from said fourth memory to obtain a desired display image and stores the image-processed foreground image data in said first memory.

3. The image processing device as claimed in claim 2, characterized in that said fourth data processing means comprises means for cutting out part of the image data stored in said third memory and transfers the cut-out image data to said fourth memory.

4. The image processing device as claimed in claim 2, characterized in that said fourth data processing means comprises means for transferring one frame of the image data stored in said third memory to said fourth memory.

5. The image processing device as claimed in claim 2, characterized in that said second data processing means further comprises priority circuit means for selecting, on a dot basis of the image data, the image data of the first type or the image data of the second type.

6. The image processing device as claimed in claim 2, characterized in that said third data processing means comprises decoder means for reading and expanding compressed moving picture data in an external storage device and for writing expanded moving picture data into said third memory.

7. The image processing device as claimed in claim 2, characterized in that said fourth data processing means further comprises means for transferring the image data to said second data processing means from said third memory; and priority circuit means for selecting, on a dot basis of the image data, one of the image data of the first type, the image data of the second type and the image data read from said third memory.

8. An image processing device comprising:

first data processing means;

a first memory and a second memory;

second data processing means for storing image data in said first memory under control of said first data processing means, producing image data of a first type by performing a predetermined image process for processing the image data read from said first memory to obtain a desired display image, and storing produced image data in said second memory;

third data processing means, having a third memory, for producing image data of a second type and storing the image data of the second type in said third memory;

fourth data processing means for combining the image data from said second and third memories and outputting resultant display image information; and fifth data processing means, having a fourth memory, for reading data of a moving picture from an outside of the image processing device and storing the data of the moving picture in said fourth memory, said first data processing means comprising means for reading the data of the moving picture stored in said fourth memory and storing read data of the moving picture in said first memory, and said second data processing means comprising means for performing a predetermined image process for the data of the moving picture read from said second memory to obtain a desired image and storing image-processed data of the moving picture in said second memory.

9. The image processing device as claimed in claim 8, characterized in that said first data processing means further comprises means for transferring the data of the moving picture from said fourth memory to said fourth data processing means, and priority selecting means for selecting, on a dot basis of the image data, one of the image data read from said second memory, the image data read from said third memory and the image data read from said fourth memory.

10. An image processing device characterized by comprising:

a first memory;

first data processing means for reading a series of moving picture data from an external device and storing the series of moving picture data in said first memory;

a second memory;

a second data processing means including means for writing still-picture data in said second memory and means for writing the moving picture data stored in said first memory in said second memory;

a third memory;

third data processing means for producing first display image data by sequentially reading either the still-picture data or the moving picture data from said second memory and performing a predetermined image process for processing read data so that a series of motion can be represented and for storing the first display image data in said third memory;

a fourth memory;

fourth data processing means for producing second image data and storing the second image data in said fourth memory; and fifth data processing means for combining the image data read from said third and fourth memories and for outputting resultant display image information.

11. An image processing device characterized by comprising:

a moving picture frame buffer memory;

first data processing means for reading a series of moving picture data from an external storage device and sequentially storing the series of moving picture data in said moving picture frame buffer memory;

a first video memory;

a second data processing means including means for writing still-picture data in said first video memory and means for writing the moving picture data stored in said moving picture frame buffer memory into said first video memory;

a second frame buffer memory;

third data processing means for sequentially reading the still-picture data and the moving picture data from said first video memory and performing a predetermined image process for processing read data so that foreground image data for representing a series of motion is produced and for storing the foreground image data in said second frame buffer memory;

a second video memory;

fourth data processing means for producing background image data and storing the background image data in said second video memory; and fifth data processing means for combining the image data read from said second frame buffer memory and said second video memory and for outputting resultant display image information.

12. A game machine, comprising:

an image processing device, comprising:

a moving picture frame buffer memory, first data processing means for reading a series of moving picture data from an external storage device and sequentially storing the series of moving picture data in said moving picture frame buffer memory, a first video memory, a second data processing means including means for writing still-picture data in said first video memory and means for writing the moving picture data stored in said moving picture frame buffer memory into said first video memory, a second frame buffer memory, third data processing means for sequentially reading the still-picture data and the moving picture data from said first video memory and performing a predetermined image process for processing read data so that foreground image data for representing a series of motion is produced and for storing the foreground image data in said second frame buffer memory, a second video memory, fourth data processing means for producing background image data and storing the background image data in said second video memory, and fifth data processing means for combining the image data read from said second frame buffer memory and said second video memory and for outputting resultant display image information;

said image processing device further comprises an I/O controller for accommodating a game control device, means for connecting said image processing device to the external storage device, and means for executing a game program, said first data processing means comprises a decoder for expanding compressed moving picture data, wherein the game program and the compressed moving picture data are stored in the external storage device, the game program is input to said image processing device, said first data processing means reads and expands the compressed moving picture data, and stores the expanded moving picture data in said moving picture frame buffer memory.

13. A method including step (a) of storing image data in a first memory, step (b) of sequentially reading desired image data from said first memory, producing display image data of a first type representing motion, and storing the produced display image data in a second memory, step (c) of producing display image data of a second type in a third memory, and step (d) of sequentially reading image information from said second and third memories, combining the display image data of the first and second types to thereby produce superimposed display image data, characterized in that said method comprises:

step (e) of sequentially reading a series of moving picture data stored in an external storage device and storing the series of moving picture data in a fourth memory; and step (f) of sequentially reading the moving picture data stored in said fourth memory and storing the moving picture data in said first memory, in the step (b), the moving picture data being subjected to a predetermined image process and being stored, as the first display image data, in said second memory.

14. The method as claimed in claim 13, characterized in that the step (d) sequentially reads the moving picture data stored in said third memory and combines the moving picture data with a display image to thereby produce said superimposed display image data.

15. An image processing method comprising the steps of:

(a) sequentially reading a series of moving picture data from an external device and storing the read data in a first memory;

(b) producing still-picture data and storing the produced data in a second memory;

(c) storing the moving picture image read from said first memory in said second memory;

(d) performing a predetermined image process for the still-picture data read from said second memory to produce foreground image data representing a series of motion, and storing the thus produced foreground image data in a third memory when the still-picture data is stored in said second memory;

(e) performing a predetermined image process for the moving picture data read from said second memory to produce foreground image data including a moving picture, and storing the thus produced foreground image data in said third memory;

(f) producing background image data and storing the background image data in a fourth memory; and (g) reading the image data from said third and fourth memories and producing display image data by combining the foreground image data and the background image data.

* * * * *